(12) United States Patent
Felsl et al.

(10) Patent No.: US 7,182,358 B2
(45) Date of Patent: Feb. 27, 2007

(54) BICYCLE

(76) Inventors: Andreas Felsl, Semmelbergstrasse 6, D-83707 Bad Wiessee (DE); Stephan Albrecht, Heigenkam 1, D-83627 Warngau (DE)

( * ) Notice: Subject to any disclaimer, the term of this patent is extended or adjusted under 35 U.S.C. 154(b) by 0 days.

(21) Appl. No.: 10/483,158

(22) PCT Filed: Jun. 4, 2002

(86) PCT No.: PCT/EP02/06133

§ 371 (c)(1), (2), (4) Date: Jun. 28, 2004

(87) PCT Pub. No.: WO03/004344

PCT Pub. Date: Jan. 16, 2003

(65) Prior Publication Data

US 2004/0232650 A1    Nov. 25, 2004

(30) Foreign Application Priority Data

Jul. 6, 2001 (DE) ............ 201 11 247 U
Feb. 20, 2002 (DE) ............ 202 02 656 U
Apr. 11, 2002 (DE) ............ 202 05 643 U

(51) Int. Cl.
*B62K 21/02* (2006.01)
*B62K 3/02* (2006.01)

(52) U.S. Cl. ............ 280/283; 280/276; 280/275; 280/282.2; 280/284

(58) Field of Classification Search ............ 280/276, 280/283

See application file for complete search history.

(56) References Cited

U.S. PATENT DOCUMENTS 2,115,072 A    4/1938    Hunt et al.
3,861,740 A    1/1975    Tajima et al.

(Continued)

FOREIGN PATENT DOCUMENTS

DE        31 06 122 A1    12/1981

(Continued)

*Primary Examiner*—Lesley D. Morris
*Assistant Examiner*—Marlon Arce-Diaz
(74) *Attorney, Agent, or Firm*—Blakely, Sokoloff, Taylor & Zafman; Stephen M. De Klerk

(57) ABSTRACT

The invention relates to a bicycle adjusting device, in particular an adjusting device for adjusting the height of the front wheel suspension, the rear wheel suspension, the saddle or of the steering mechanism of a bicycle, e.g. of a mountain bike, a bicycle with at least one bicycle adjustment device, as well as a bicycle-steering head bearing system, whereby the adjustment has at least one double-acting piston-cylinder assembly with a first cylinder space (14a, 34a) and a second cylinder space (15a, 35a) in each case, and whereby the two cylinder spaces of the two adjustment devices are interconnectable by means of a fluid duct fitted for that purpose.

25 Claims, 11 Drawing Sheets

U.S. PATENT DOCUMENTS

Figure 1:
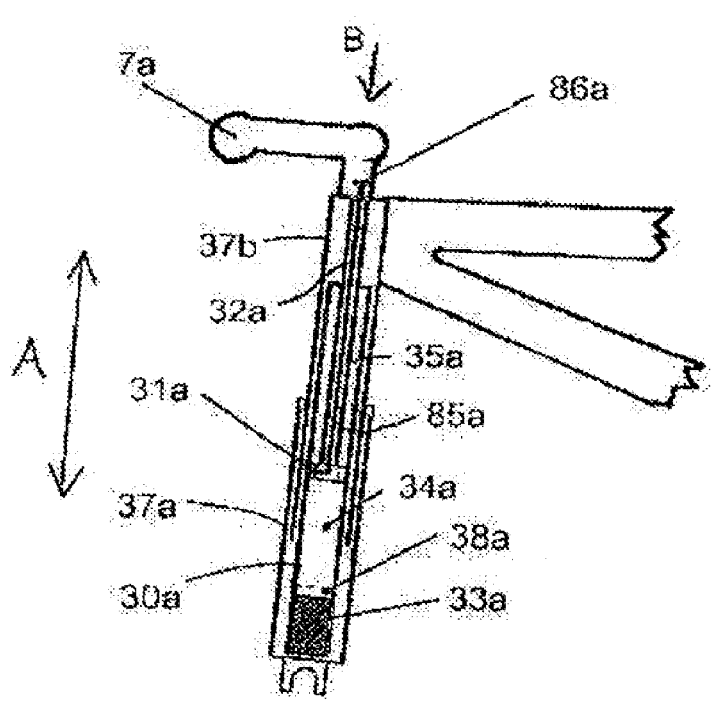

| | | | |
|---|---|---|---|
| 4,159,105 A | 6/1979 | Vander Laan et al. | |
| 4,410,197 A | 10/1983 | St. Hillaire | |
| 4,582,343 A | 4/1986 | Waugh | |
| 4,679,811 A | 7/1987 | Shuler | |
| 4,735,276 A | 4/1988 | Burton | |
| 5,086,866 A * | 2/1992 | Banjo et al. | 180/219 |
| 5,320,375 A | 6/1994 | Reeves et al. | |
| 5,348,112 A | 9/1994 | Vaillancourt | |
| 5,517,878 A | 5/1996 | Klein et al. | |
| 5,803,482 A | 9/1998 | Kim | |
| 5,860,660 A | 1/1999 | Garcia | |
| 5,971,116 A * | 10/1999 | Franklin | 188/282.4 |
| 5,996,745 A | 12/1999 | Jones, Jr. et al. | |
| 6,042,091 A * | 3/2000 | Marzocchi et al. | 267/64.15 |
| 6,044,940 A | 4/2000 | Marzocchi et al. | |
| 6,286,642 B1 * | 9/2001 | Yi | 188/319.2 |
| 6,863,291 B2 * | 3/2005 | Miyoshi | 280/283 |
| 2001/0030408 A1 | 10/2001 | Miyoshi | |
| 2002/0008339 A1 | 1/2002 | Ogura | |
| 2003/0094784 A1* | 5/2003 | Miyoshi | 280/284 |
| 2003/0193161 A1* | 10/2003 | Turner et al. | 280/276 |
| 2005/0087953 A1* | 4/2005 | Becker et al. | 280/276 |

FOREIGN PATENT DOCUMENTS

| | | |
|---|---|---|
| DE | 41 23 643 A1 | 6/1992 |
| DE | 41 01 745 A1 | 7/1992 |
| DE | 43 34 392 A1 | 4/1995 |
| DE | 696 04 320 T2 | 4/1995 |
| DE | 298 10 431 U 1 | 11/1999 |
| DE | 198 55 161 C 1 | 2/2000 |
| DE | 200 05 224 U1 | 3/2000 |
| DE | 100 01 692 A1 | 8/2000 |
| DE | 199 53 901 A 1 | 7/2001 |
| DE | 200 05 224 U 1 | 8/2001 |
| EP | 0 381 805 A2 | 2/1989 |
| EP | 0 594 817 | 11/1993 |
| FR | 869445 | 9/1948 |
| FR | 2671324 A1 | 1/1991 |
| FR | 2 679 512 A1 | 7/1991 |
| GB | 570439 | 7/1943 |
| JP | 11-165684 A | 6/1999 |
| WO | WO 93/21056 | 10/1993 |
| WO | WO 93/23283 | 11/1993 |
| WO | WO 95/10444 A1 | 10/1994 |
| WO | WO 95/10444 | 4/1995 |
| WO | WO 97/29007 | 8/1997 |
| WO | WO 99/03721 | 1/1999 |
| WO | WO 01/70563 | 9/2001 |

* cited by examiner

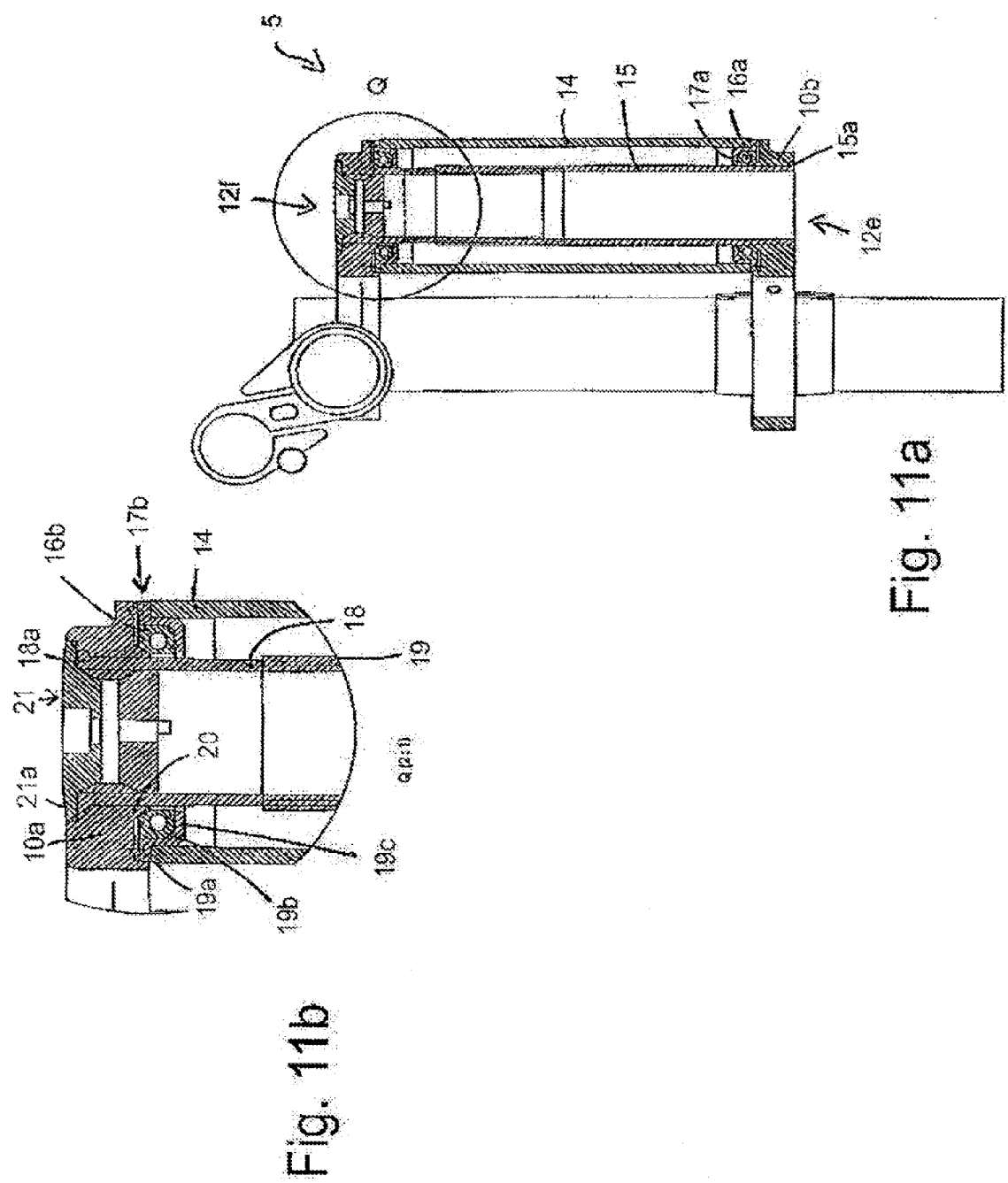

BICYCLE

This Application is a National Phase of International Application No. PCT/EP02/06133, filed on Jun. 4, 2002, which claims priority from German Patent Application No. 201 11 247.7, filed on Jul. 6, 2001; German Patent Application No. 202 02 656.6, filed on Feb. 20, 2002; and German Patent Application No. 202 05 643.0, filed on Apr. 11, 2002.

The present invention relates to a bicycle adjusting device, in particular a device for adjusting the height of the front wheel suspension, the rear wheel suspension, the saddle or of the steering mechanism of a bicycle, e.g. of a mountain bike or a bicycle with at least one bicycle adjustment device, as well as a bicycle steering head bearing system.

With conventional bicycles the height of the front wheel suspension, the rear wheel suspension, the saddle or the steering mechanism are not adjustable at all or only adjustable with difficulty.

The invention is aimed at providing a novel bicycle adjustment device and/or a novel bicycle, as well as a novel bicycle steering head bearing system.

The invention achieves the above and further aims by means of the objects in Claim 1. Advantageous developments of the invention are contained in the subsidiary claims.

When the bicycle adjustment device described in this invention is installed in a bicycle, the user of the bicycle can easily adjust the bicycle geometry to suit current conditions. For instance, the height of the front and/or rear wheel suspension may be changed while the bicycle is in use, preferably while being ridden.

The new adjustment device described in this invention is particularly suited to mountain bikes. For instance, the front wheel may be retracted while riding uphill with the mountain bike, and extended again when riding downhill. Alternatively and additionally the rear wheel may be extended while riding uphill and retracted again while riding downhill.

By shifting the rider's center of gravity further back, the risk of the rider pitching forward and/or overloading the arms and wrist joints is reduced. When riding uphill, the center of gravity of the rider may again be moved forward. In this way the power transmission effort is more efficiently applied while an uncomfortable and taxing elevation of the front wheel is avoided.

This present application relates to the international application PCT/EP 01/00074 by the same applicant, which has been made fully public by being incorporated in this present application.

Figure 2:
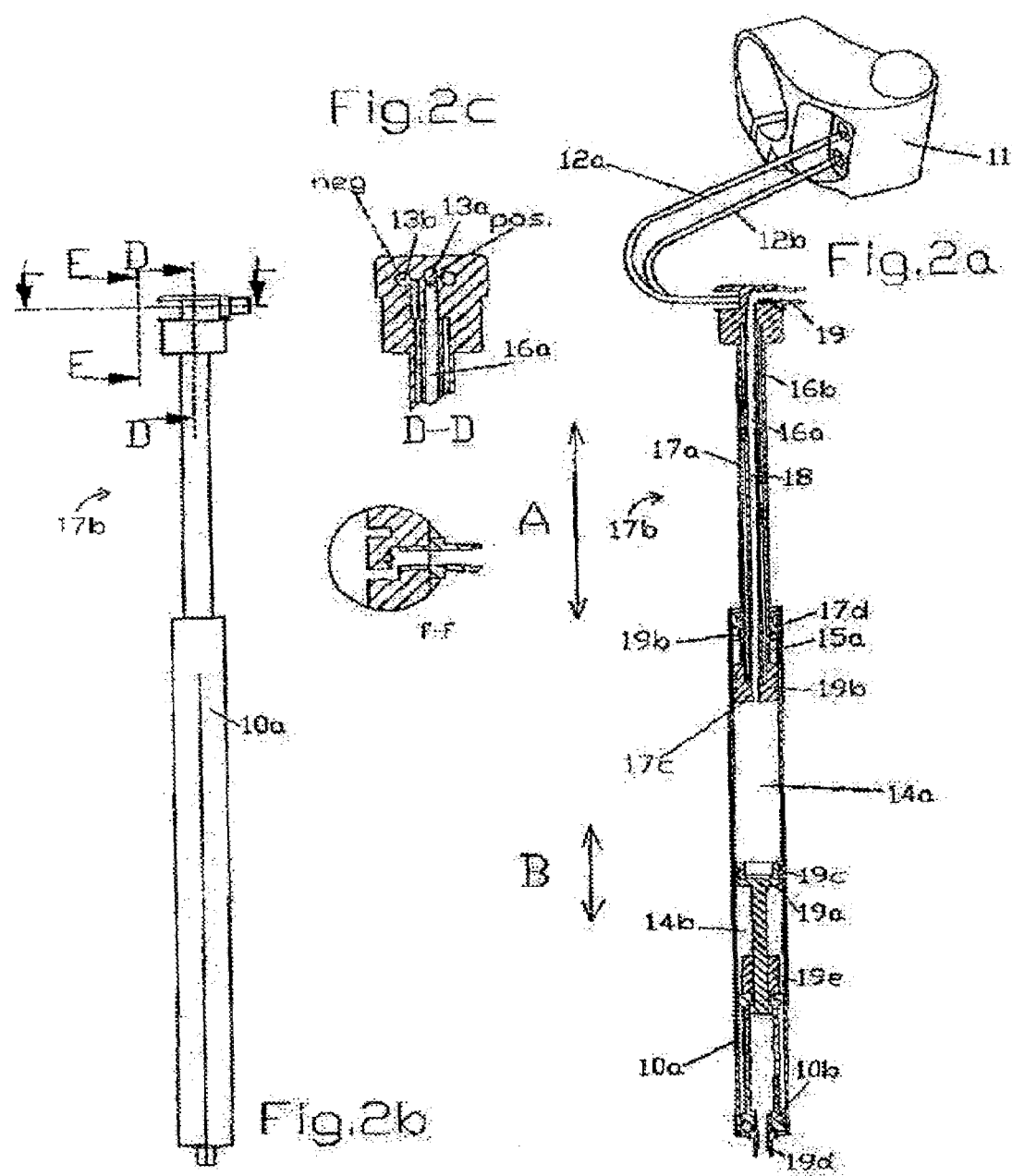

Below, the invention is explained in more detail by means of further embodiments and illustrations. The illustrations show:

FIG. 1 an adjusting device according to a first embodiment example of the invention in longitudinal section;

FIG. 2*a* an adjusting device according to a second embodiment example of the invention in longitudinal section;

FIG. 2*b* a perspective view of the adjustment device shown in FIG. 2*a*

FIG. 2*c* a detailed representation of the top section of the plunger in longitudinal section as shown in FIGS. 2*a* and 2*b*.

Figure 3:
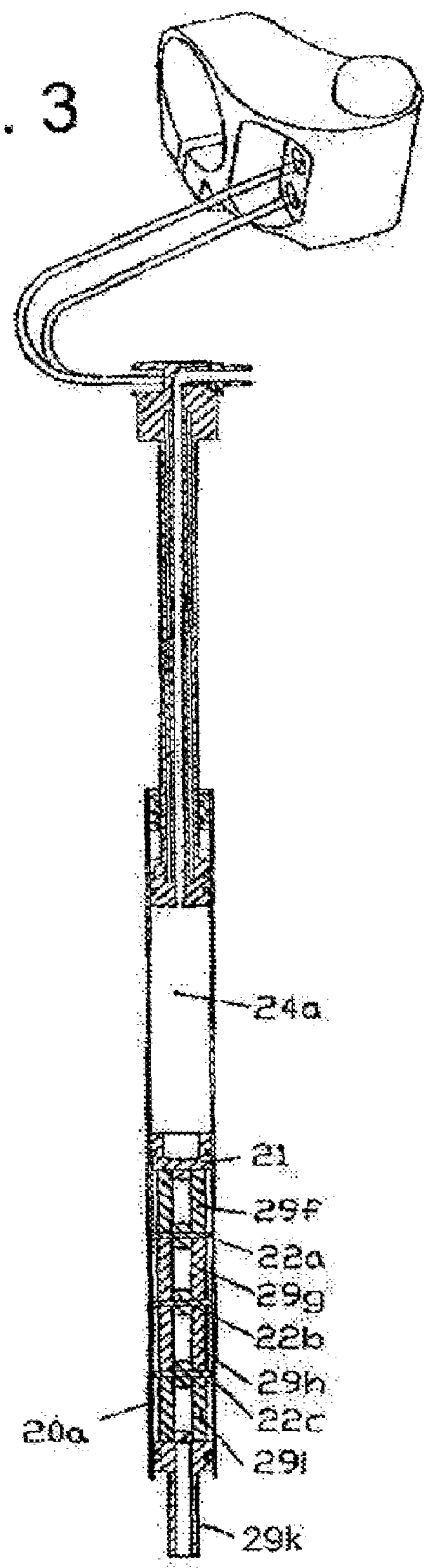
Figure 4:
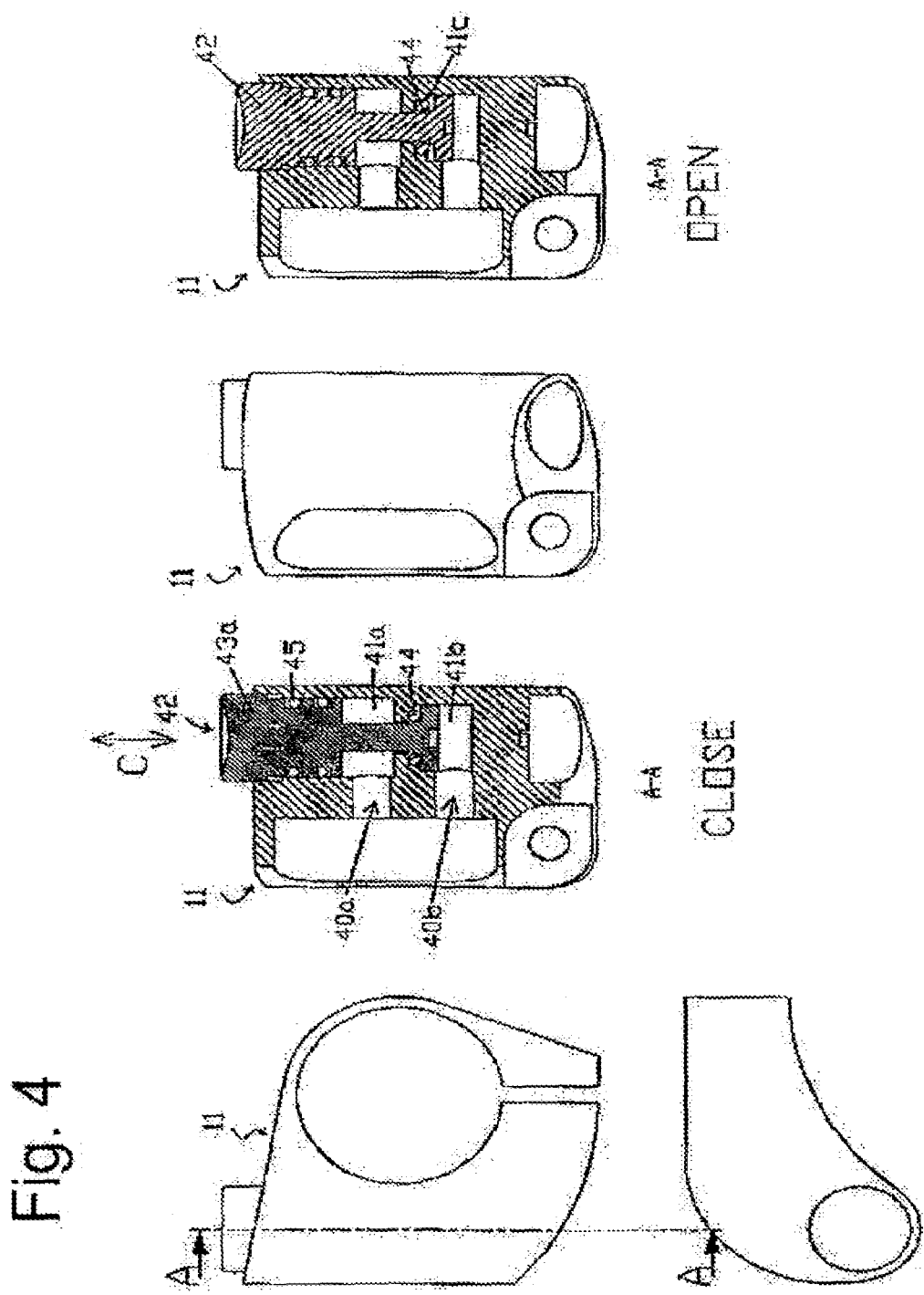
Figure 5:
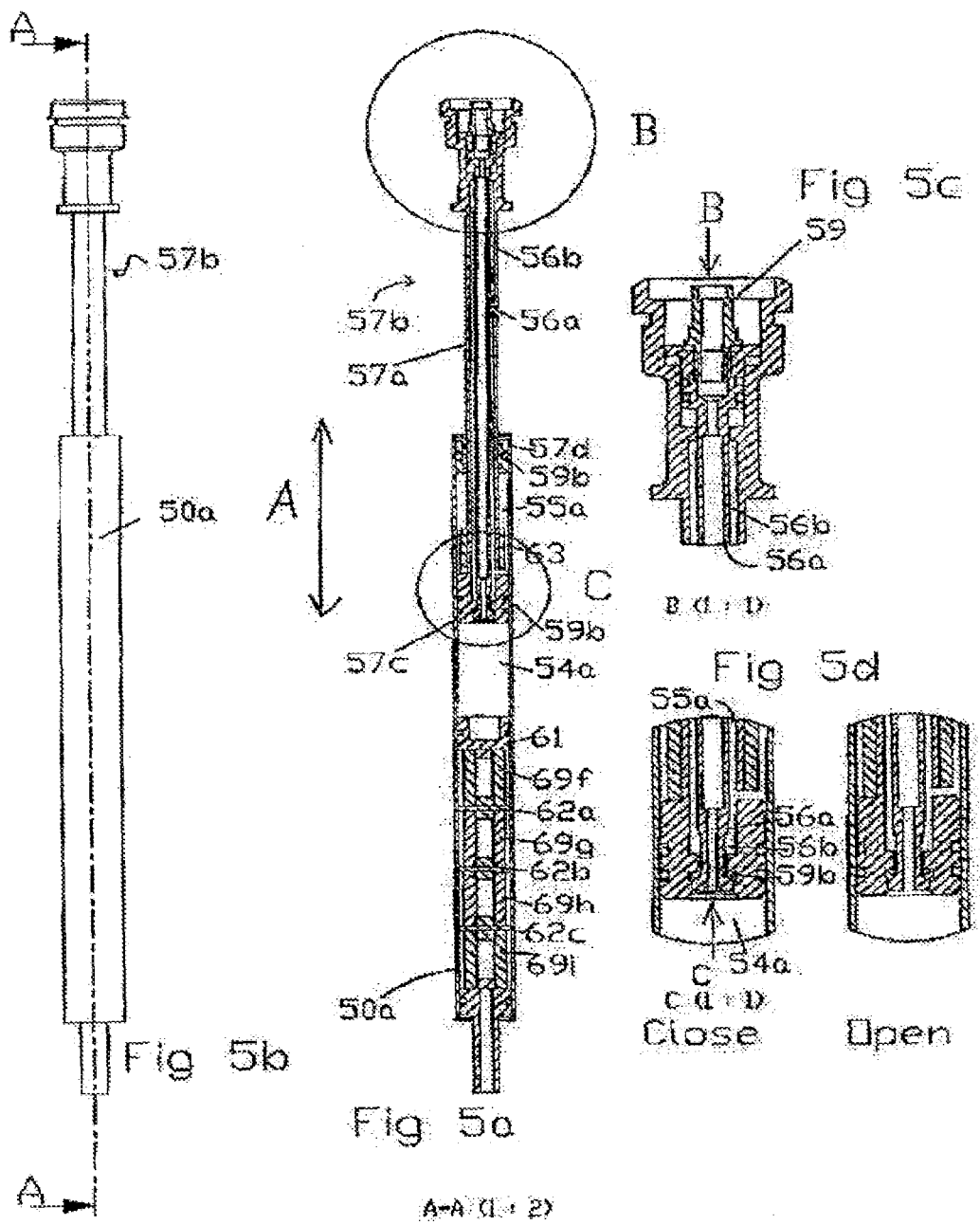
Figure 6:
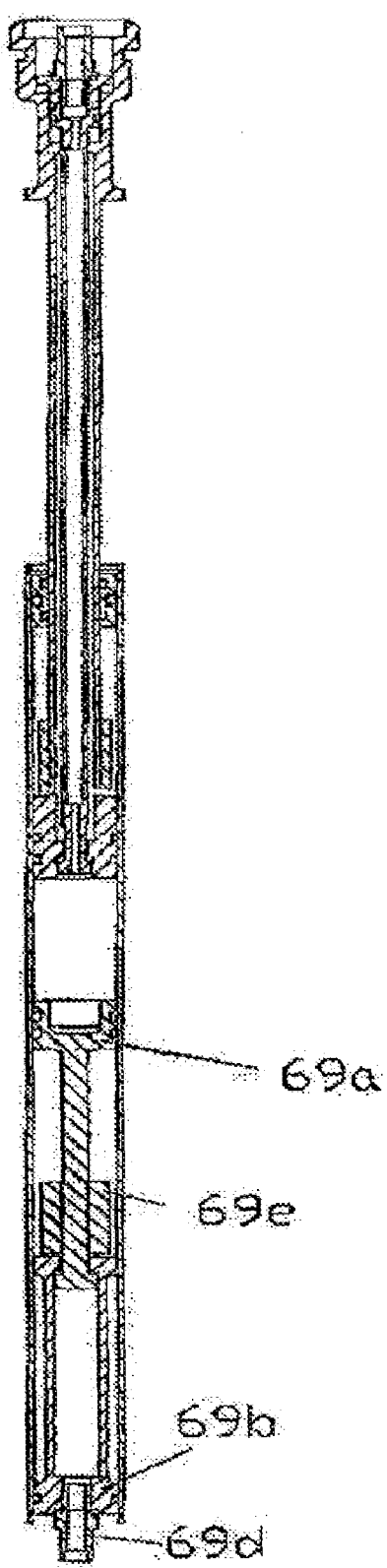
Figure 7:
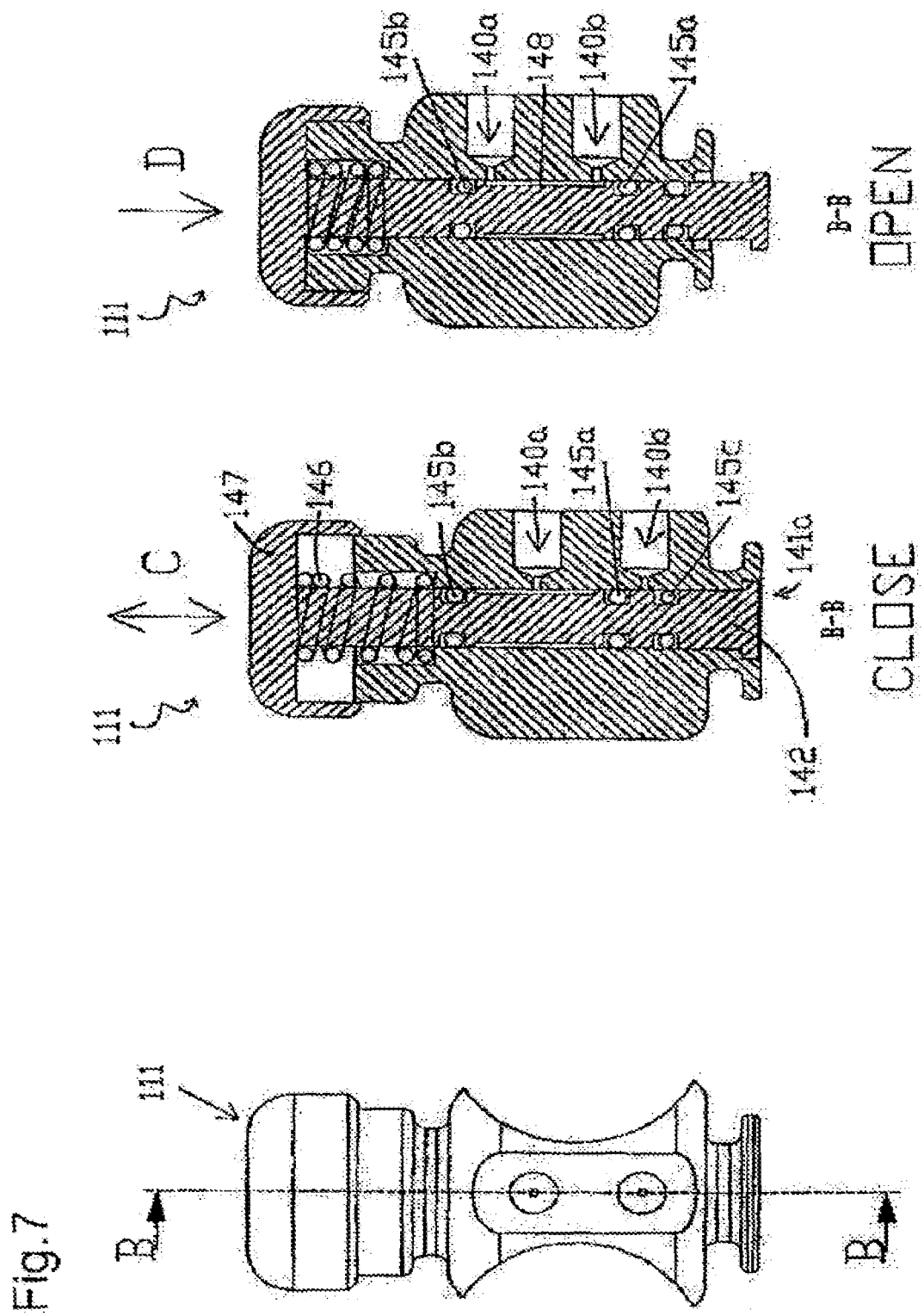
Figure 8:
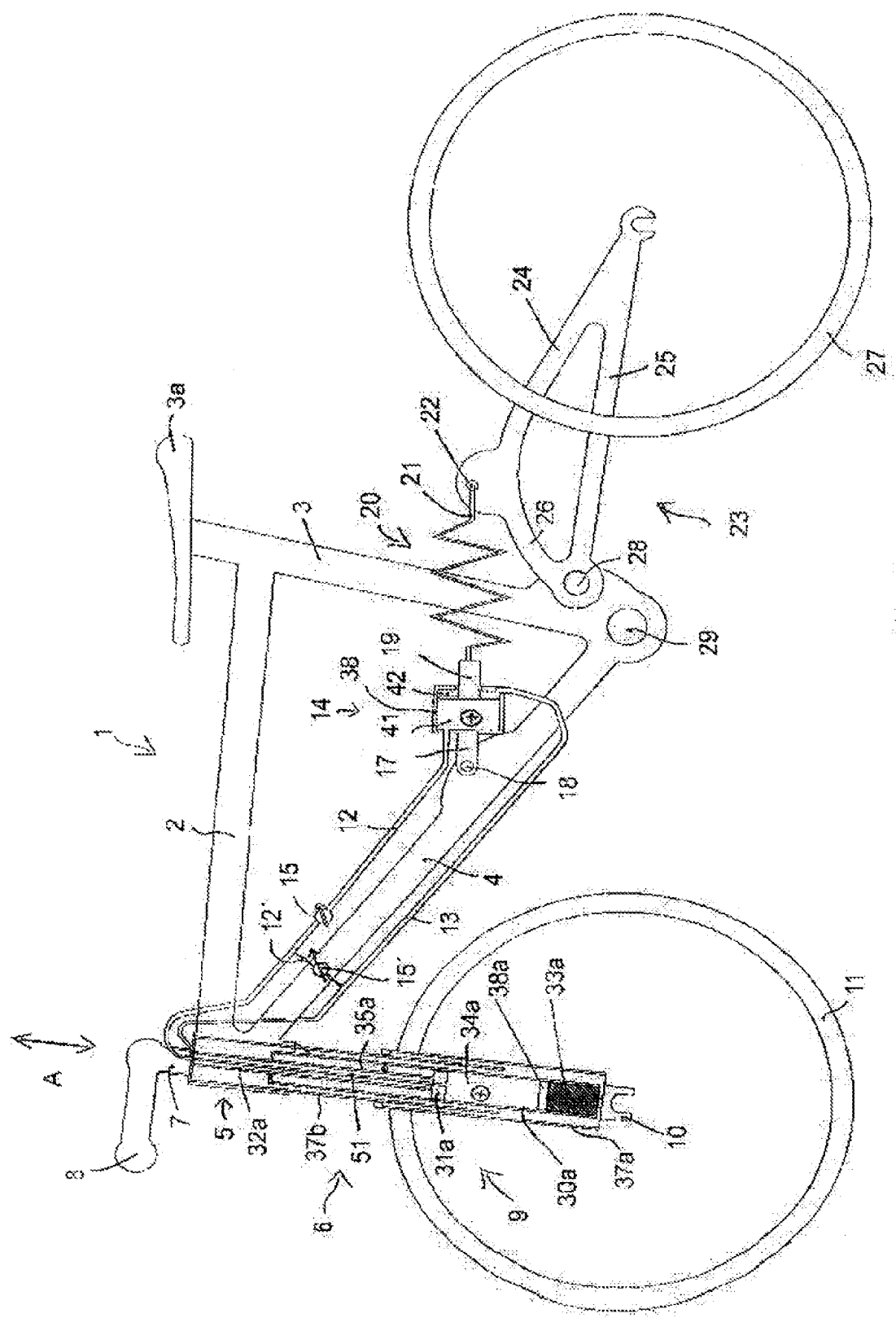
Figure 9:
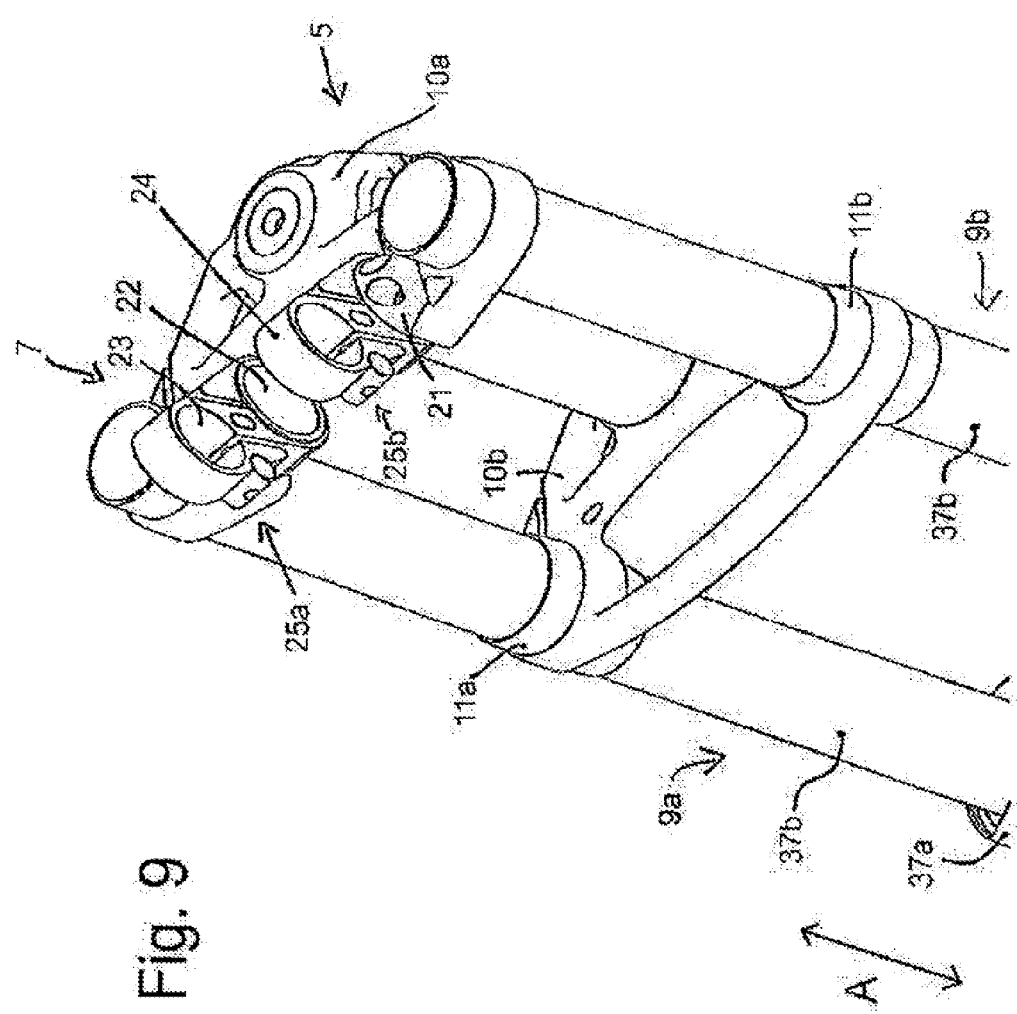
Figure 10:
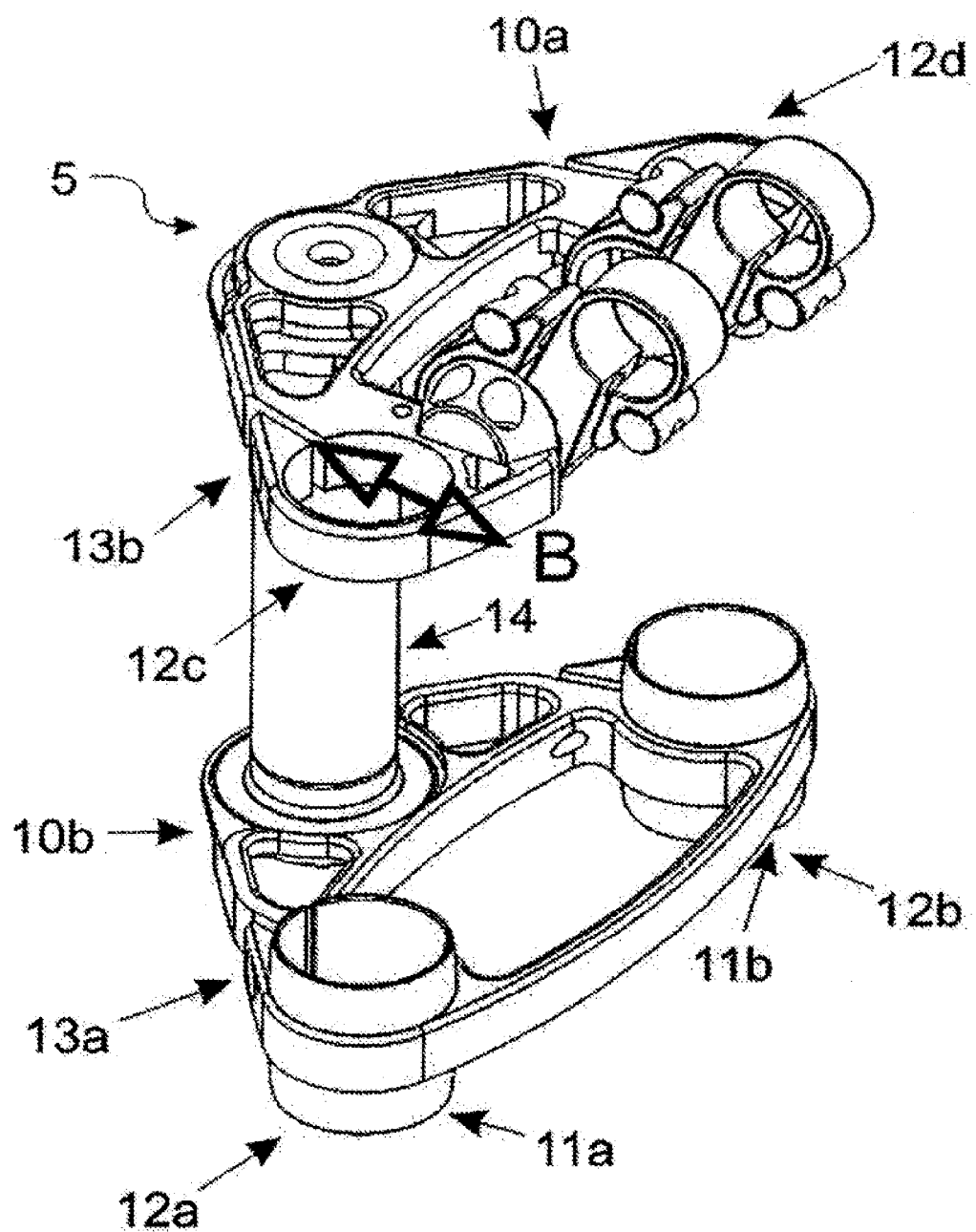

FIG. 3 an adjusting device according to a third embodiment example of the invention in longitudinal section;

FIG. 4 a detailed representation of the switch shown in FIGS. 2*a*, 2*b*, 2*c*, and used in the adjustment device shown in FIG. 3;

FIG. 5*a* an adjusting device according to a fourth embodiment example of the invention in longitudinal section;

FIG. 5*b* a perspective view of the adjustment device shown in FIG. 5*a*;

FIG. 5*c* a detailed representation of the upper part of the plunger shown in FIGS. 5*a* and 5*b* in longitudinal section;

FIG. 6 an adjusting device according to a fourth embodiment example of the invention in longitudinal section;

FIG. 7 a detailed representation of an alternative embodiment example of the switch as shown in FIGS. 2*a*, 2*b*, 2*c*, and as used with the adjustment device shown in FIG. 3;

FIG. 8 a bicycle with two adjustment devices according to an embodiment example of the invention in longitudinal section;

FIG. 9 a perspective representation seen from the front right of a bicycle steering head bearing system to which two legs of a front fork and a steering assembly have been fitted;

FIG. 10 a perspective representation, seen from the front left, of the bicycle steering head bearing system shown in FIG. 9 with the steering assembly fitted, but without the fork legs;

FIG. 11 a longitudinal section through the steering head bearing system, with fork legs and steering mechanism fitted as shown in FIGS. 9 and 10; and FIG. 11*b* a detailed view of part of a longitudinal section of the steering head bearing system shown in FIG. 11*a*.

In FIG. 1*a* device for adjusting the height of the front wheel suspension of a bicycle according to an embodiment example of the present invention is shown. A pneumatic cylinder 30*a* is attached at its bottom end to a guide tube 37*a* by means of a threaded connection. A tube 37*b* with a piston rod 32*a* attached to it, is fitted to a steering unit 7*a*, which consists of handlebars, steering tube and (fork) yoke. A piston 31*a* that is sliding fit in the pneumatic cylinder 30*a* is fitted to the bottom end of the piston rod 32*a*. The tube 37*b* and the piston rod 32*a* are longitudinally adjustable in relation to the guide tube 37*a* and the pneumatic cylinder 30*a*, i.e. in the direction of the arrow A.

The first cylinder space 34*a*, i.e. the "plus chamber", is formed by the pneumatic cylinder 30*a*. The second cylinder space 35*a*, i.e. the "minus chamber", is an annular cylinder space, formed by the pneumatic cylinder 30*a*, the piston rod 32*a* and the piston 31*a*. The bottom outside area of the piston 31*a* that delimits the first cylinder space 34*a* at the top is larger than the annular top outside area of the piston 31*a* that delimits the second cylinder space 35*a* at the bottom.

A connecting hole, which can be opened or shut by means of a valve, has been provided in the piston 31*a*, which connects the first cylinder space 34*a* with the second cylinder space 35*a*. The valve is connected to an actuator 85*a*, which is raised to the level of the steering unit 7*a* by the piston 31*a* and/or the piston rod 32*a*. At the level of the steering unit and/or handlebars the actuator 85*a* has an actuator element 86*a*. When it is actuated, the valve opens and/or shuts.

When the valve is shut, an equalization of forces between the "plus chamber" and "minus chamber" takes place at piston 31*a*, whereby the piston 31*a*, the piston rod 32*a* and the tube 37*b* take up a particular setting in relation to the guide tube 37*a* and the pneumatic cylinder 30*a*, for instance the setting shown in FIG. 1. When the valve is opened, the "plus chamber" 34*a* and the "minus chamber" 35*a* are interconnected, so that an equalization of pressure between the chambers can take place. The piston 31*a*, the piston rod 32*a* and the tube 37*b* move upwards in relation to the guide tube 37*a* and the pneumatic cylinder 30*a*, in the direction of the arrow A. When the valve is shut again, an equalization of forces again takes place at piston 31*a* between the "plus chamber" and "minus chamber", whereby the piston 31*a*, the piston rod 32*a* and the tube 37*b* take up a second setting in relation to the guide tube 37*a* and the pneumatic cylinder 30*a*, e.g. a setting that lies above that shown in FIG. 1. In this setting the bicycle is particularly well suited to downhill riding.

For uphill riding the valve is opened again, and the piston 31*a*, the piston rod 32*a* and the tube 37*b* pushed down again by the bicycle rider in relation to the guide tube 37*a* and the pneumatic cylinder 30*a*, in the direction of the arrow A. This may be achieved for instance by the user of the bicycle applying downward pressure on the steering unit 7*a* in the direction of Arrow B. When the valve is re-shut, an equilibrium of forces again takes place at piston 31*a* between "plus chamber" 34*a* and "minus chamber" 35*a*, whereby the piston 31*a*, the piston rod 32*a* and the tube 37*b* assume a third setting in relation to the guide tube 37*a* and the pneumatic cylinder 30*a*, that for instance lies below the setting shown in FIG. 1. In this setting the bicycle is particularly well suited to uphill riding.

At the bottom end of the pneumatic cylinder 30*a* an element 33*a* of elastic material is fitted. Over it is a float body 38*a* that seals off the first cylinder space 34*a* from the cylinder space in which the elastic element 33*a* is fitted.

FIGS. 2*a*, 2*b* and 2*c* show an adjusting device according to a further embodiment example of the present invention. In FIG. 2*b* a pneumatic cylinder 10*a* is shown, connected at its lower end to a wheel suspension (not shown), to which the front wheel of a bicycle is attached. A piston-shaped plunger 17*b*, of which the lower, wider end section 17*c* slides into the pneumatic cylinder 10*a* according to FIG. 2*a*, is attached to the steering unit (not shown) consisting of handlebars, steering tube and (fork) yoke of the bicycle. The plunger 17*b* and the pneumatic cylinder 10*a* both show a perfectly circular outline in cross-section, with the outside diameter of the lower end section 17*c* of the plunger 17*b* essentially the same as the inside diameter of the pneumatic cylinder 10*a*. The plunger 17*b* is longitudinally adjustable in relation to the pneumatic cylinder 10*a*, i.e. in the direction of arrow A.

The outside wall of the pneumatic cylinder 10*a* encloses a first cylinder space 14*a*, which forms the "plus chamber". The "plus chamber" 14*a* is delimited at the bottom by the floating piston 19*a*, and at the top by the underside of the lower end section 17*c* of the plunger 17*b*. To seal the "plus chamber" 14*a* at the lower end, O-ring seals 19*c* have been provided on the outside wall of the float piston 19*a*, seated in corresponding machined annular grooves in the float piston 19*a*. Similarly, O-ring seals 19*b*, seated in corresponding machined annular grooves on plunger 17*b*, have been provided on the outside wall of the lower end section 17*c* of the plunger 17*b*, for sealing the "plus chamber" 14*a* at the upper end.

The outer wall of the pneumatic cylinder 10*a* also encloses a second, annular cylinder space 15*a*, which forms the "minus chamber". The "minus chamber" 15*a* is delimited at its bottom end by the annular upper sides of the bottom end section 17*c* of the plunger 17*b*; at its top by an O-ring seal 17*d* attached to the pneumatic cylinder 10*a*, and to the inside by the outside wall of a central, thinner section 17*a* of the plunger 17*c*. Surrounding O-ring seals 19*b* have been provided on the outside and inside walls of the seal 17*d*, seated in correspondingly machined annular grooves in the seal 17*d* in order to seal the "minus chamber" 15*a* at the top. The central, narrower section 17*a* of the plunger 17*c* is a sliding fit in the circular central opening of the seal 17*d*, and is adjustable in a longitudinal direction in relation to the seal 17*d*, i.e. in the direction of the arrow A.

The area of the bottom end section 17*c* of the plunger 17*b* delimiting the first cylinder space 14*a* at the top, is larger than the area of the annular upper side of the bottom end section 17*c* of the plunger 17*b* that delimits the second cylinder space 15*a* at the lower end.

A first hydraulic line 16*a* runs longitudinally through the center of the plunger 17*b*, which is connected at the bottom to the "plus chamber" 14*a*. The first hydraulic line 16*a* has an essentially circular cross section. A second hydraulic line 16*b*, which is connected at the bottom to the "minus chamber" 15*a*, e.g. via corresponding drilled holes, also runs longitudinally through the plunger 17*b*. The second hydraulic line 16*b* has an annular cross-section and is separated from the first hydraulic line 16*a* by means of tubular intermediate element 18.

At the top of plunger 17 there is a check valve 19, through which air from the outside can be pumped into the first hydraulic line 16*a*, and into the "plus chamber" 14*a*. The check valve 19 prevents the air from escaping again to the outside from the "plus chamber" 14*a* and the first hydraulic line 16*a*. According to FIG. 2*c* the first hydraulic line 16*a* is connected via a horizontal aperture 13*a* to the first hose shown in FIG. 2*a* at the top of the plunger 17*b*, and according to FIG. 2*c* the second hydraulic line 16*b* via a horizontal aperture 13*b* to the second hose 12*b* shown in FIG. 2*a*. There is a switch 11 between the two hoses 12*a*, 12*b* that performs the function of a valve between the hoses 12*a* and 12*b*. A hydraulic connection can be established between the hoses 12*a* and 12*b* by means of the switch 11, or hose 12*a* can be hermetically separated from 12*b*.

When switch 11 is closed, i.e. when the connection between hoses 12*a* and 12*b* is broken, an equalization of forces occurs between the "plus chamber" 14*a* and the "minus chamber" 15*a* at the lower end section 17*c* of plunger 17*b*, whereby plunger 17*b* assumes a first setting in relation to pneumatic cylinder 10*a*. When switch 11 is opened, the "plus chamber" 14*a* and the "minus chamber" 15*a* are interconnected via the first hydraulic line 16*a*, as are the first hose 12*a*, the second hose 12*b* and the second hydraulic line 16*b*, so that an equalization of pressure can take place between the chambers 14*a* and 15*a*. The plunger 17*b* then moves upwards in the direction of arrow A in relation to the pneumatic cylinder 10*a*. When the switch 11 is closed again, an equalization of forces between the "plus chamber" and "minus chamber" again takes place at the lower end section 17*c* of the plunger 17*b*, whereby the plunger 17*b* assumes a second setting in relation to the pneumatic cylinder, e.g. the setting shown in FIG. 2*a*. In this setting the bicycle is particularly well suited to riding downhill.

For uphill riding the switch 11 is opened again, and the plunger 17*b* pressed downward in relation to the pneumatic cylinder 10*a* in the direction of the arrow A by the user of the bicycle. When switch 11 is closed again, an equalization of forces between the "plus chamber" and "minus chamber" again takes place at the lower end section 17*c* of the plunger 17*b*, whereby the plunger 17*b* assumes a third setting in relation to the pneumatic cylinder 10*a*, which for instance lies below the setting shown in FIG. 2*a*. In this setting the bicycle is particularly well suited to riding uphill.

An upper, wider end section of the float piston 19*a* is a sliding fit in the pneumatic cylinder 10*a*. In the same way, the lower end section of the float piston 19*a* is sliding fit in spacer 10*b*, which is attached to the bottom end of the pneumatic piston 10*a*. The float piston 19*a* is also adjustable in relation to the pneumatic cylinder 10a in a longitudinal direction, i.e. in the direction of an arrow B, and serves as a lower shock absorber.

The upper side of the top end section of the float piston 19 that delimits the area of the first cylinder space 14a at the bottom, is larger than the area of the annular underside of the top end section of the float piston 19a that delimits the lower air chamber 14b at the top.

A check valve 19d is fitted at the bottom of the pneumatic piston 10a, through which air can be pumped from the outside into the lower air chamber 14b. The check valve 19d prevents the air from escaping from the bottom air chamber 14b to the outside. In order to seal off the lower air chamber 14b at the bottom, O-ring sealing elements have been provided on the outside wall of the spacer 10b, fitted in corresponding machined circular grooves.

As an additional shock absorber, an annular rubber buffer 19e is fitted at the top end of the spacer 10b, into the central aperture of which the narrower center section of the float piston 19a is inserted. Alternatively, the rubber buffer 19e may be dispensed with. The sealing elements 19c have been arranged in such a way that a stop provided on the pneumatic cylinder 10a prevents the float piston 19a from being able to be shifted up too high.

In FIG. 3 an adjusting device according to a third embodiment example of the invention is shown. This is identical to the adjustment device illustrated in connection with FIG. 2a, 2b, 2c, except that instead of the shock absorber installed there—formed by the float piston 19a and the rubber buffer 19e—several superimposed annular elastomers 29f, 29g, 29h, 29i are used as shock absorbers. Spacer discs 22a, 22b, 22c are located between each two elastomers 29f, 29g, 29h, 29i. Each spacer disc 22a, 22b, 22c has a flange at the top and bottom, which all fit into the central aperture of an elastomer 29f, 29g, 29h, 29i. A float body 21 is fitted over the uppermost elastomer 29f to seal off the "plus chamber" 24a that is enclosed by the pneumatic cylinder 20a at the bottom—e.g. by means of a seal, in particular an O-ring. Alternatively the float body 21 can also be arranged in such a way that the float body 21 does not seal off the "plus chamber" 24a at the bottom (and neither do the elastomers 29f, 29g, 29h, 29i and the spacer discs 22a, 22b, 22c), and/or the float body-seal (and/or the elastomer 29f, 29g, 29h, 29i and spacer discs 22a, 22b, 22c) is/are made semi-permeable to air. In this way it can be achieved that air between the spaces lying above and under the float body 21 can be exchanged (and where necessary also between the various spaces lying under the float body 21). Sealing the "plus chamber" 24a at the bottom then occurs e.g. with the help of the element 29k at the bottom end. A valve may also be fitted to it, through which air can be pumped into the "plus chamber" 24.

FIG. 4 shows a detail representation of the switch 11 used in FIG. 2a, 2b, 2c, and the adjustment device used in FIG. 3. The switch 11 is attached to the handlebars of the bicycle e.g. by means of a screw. According to FIG. 2a and FIG. 4, the first hose 12a is connected to a first connecting hole 40a, and the second hose 12b to a second connecting hole 40b of the switch 11. The first connecting hole 40a is connected to a first, cylindrical hollow space 41a that runs downwards from the upper side of the switch 11. In similar fashion the second connecting hole 40b is connected to a second, cylindrical hollow space 41b. The two hollow spaces 41a, 41b are connected to each other via a central hollow space 41c, which is tapered to the top in steps.

An upper, wider end section of the switch element 42 is a sliding fit in the first hollow space 41a. A middle, narrower section of the switch element 42 is a sliding fit in the central hollow space 41c, and a bottom, wider end section of the switch element 42 is a sliding fit in the second hollow space 41b. This then means that the switch element 42 is longitudinally adjustable inside switch 11, i.e. in the direction of arrow C.

In order to seal off the first hollow space 41a at the top, O-ring seal elements 45 are provided on the outside wall of the switch element 42, fitted into corresponding machined circular grooves in the switch element 42.

The lower outside area of the bottom, wide end section of the switch element 42 that delimits the second hollow space 41b at the top, is larger than the annular top outside area of the bottom, wider end section of the switch element 42 that delimit the first hollow space 41a at the bottom. The switch element 42 is forced upwards by the pneumatic forces resulting from this. In the process an annular seal element 44 is pressed against the annular upper outside area of the bottom, wider end section of the switch element 42, as well as against an annular lower outside area of a stepped recess of the central hollow space 41c. This pneumatically separates the first hollow space 41a from the second hollow space 41b, and therewith also the plus and minus chamber 14a, 15a shown in FIG. 2 from the respective hollow spaces 41a, 41b.

When the switch element 42 is pressed down against the air pressure by the user of the bicycle in the direction of arrow D, the seal element 44 is released, so that air can flow from the first hollow space 41a via the central hollow space 41c into the second hollow space 41b, or vice versa. When the switch element 42 is again released by the user, it is forced upwards again in the direction of the arrow C by the pneumatic pressure. This causes the first hollow space 41a to be isolated again from the second hollow space 41b, and therewith also the plus and minus chambers 14a, 15a shown in FIG. 2a connected to the hollow spaces 41a, 41b.

Instead of the switch 11 shown in FIG. 4, the switch 111 shown in FIG. 7 can also be used with the adjustment device shown in FIG. 3 and in FIG. 2a, 2b, 2c, for the pneumatic separation of the "plus chamber" and the "minus chamber". The switch 111 may for instance be attached to the handlebars of the bicycle with a switch. The first hose 12a shown in FIG. 2a and FIG. 4 can be connected to a first horizontal connecting hole 140a, and according to FIG. 7, the second hose 12b to a second, horizontal connecting hole 140b of the switch 111. The connecting holes 140a, 140b are connected to a cylindrical hollow space 141a running in a longitudinal direction through the switch 111.

A cylindrical lower section of a switch element 142 is a sliding fit in the hollow space 141a. The switch element 142 is therefore adjustable inside switch 111 in a longitudinal direction, i.e. in the direction of arrow C.

In order to seal off the connecting holes 140a, 140b from each other, an O-ring seal element 145a is provided on the outside wall of the switch element 142, fitted into a corresponding circular groove on the switch element 142.

In the same way similar O-ring seal elements 145b, 145c are provided higher up and lower down on the outside wall of the switch element 142, also fitted into correspondingly machined circular grooves on the switch element 142. The seal elements 145b, 145c serve to prevent that air can escape downwards from the bottom connecting hole 140b via the hollow space 141a, and upwards from the top connecting hole 140a air via the hollow space 141a.

The hollow space 141b widens upwards in steps at a top section of the switch 111. A spring element 146 seats on the top surface of the step. A selector button 147 is fitted at the top end of the switch element 142, and the spring element 146 presses against its lower end. As shown in FIG. 7, the spring element 146 is wound in a spiral around a similar cylindrical center section of the switch element 142. The tensile force of the spring pushes the switch element 142 upwards.

When the switch element 142 is pushed down in the direction of arrow D against the spring by the user of the bicycle, the top connecting hole 140a and the bottom connecting hole 140b are connected to a groove 148, which is annularly machined into the switch element 142 between the top and the bottom seal element 145a, 145b. Consequently air can flow from the top connecting hole 140a via the groove 148 into the bottom connecting hole 140b, or vice versa. When the switch element 142 is again released by the user, it is forced upwards in the direction of the arrow C by the spring. As a result the top connecting hole 140a is again pneumatically separated from the bottom connecting hole 140b, and therewith also the plus and minus chamber 14a, 15a. shown in FIG. 2a connected to the respective connecting holes 140a, 140b.

In FIGS. 5a, 5b, 5c and 5d an adjusting device according to a further embodiment example of the present invention is shown. In relation to FIG. 5b a pneumatic cylinder 50a is attached at its bottom end to a wheel suspension (not shown) that can be attached to the front wheel of a bicycle. A piston-shaped plunger 57b is attached to a steering unit (not shown) of the bicycle consisting of handlebars, steering tube and (fork) yoke, of which the lower wider end section 57c is a sliding fit in the pneumatic cylinder 50a according to FIG. 5. The plunger 57b and the pneumatic cylinder 50a have essentially circular contours in cross section, where the outside diameter of the bottom end section 57c of the plunger 57b is essentially similar to the inside diameter of the pneumatic cylinder 50a. The plunger 57b is adjustable in a longitudinal direction, i.e. in the direction of arrow A in relation to the pneumatic cylinder 50a.

The outside wall of the pneumatic cylinder 50a encloses a first cylinder space 54a, which forms a "plus chamber". The "plus chamber" 54a is sealed off at the bottom by the float body 61. For this, an O-ring seal element are provided around the outside wall of the float body 61, fitted into a corresponding machined annular groove in the float body 61.

In the adjustment device shown in FIGS. 5a, 5b, 5c, 5d, several superimposed annular elastomers 69f, 69g, 69h, 69i have been fitted under the float body 61, to act as shock absorbers as in the adjustment device in the pneumatic cylinder 50a as shown in FIG. 3. Spacer discs 62a, 62b, 62c are fitted between every two elastomers 69f, 69g, 69h, 69i. Each spacer disc 62a, 62b, 62c has flanges at the top and bottom, which fit into the central aperture of an elastomer 69f, 69g, 69h, 69i.

The "plus chamber" 54a is delimited at the top by the underside of the bottom end section 57c of the plunger 57b. For sealing the "plus chamber" 54a at the top, bring seal elements 59b have been provided on the outside wall of the bottom end section 57c of the plunger 57b, fitted into corresponding machined circular grooves of the plunger 57b.

Furthermore the outside wall of the pneumatic cylinder 50a encloses a second, annular cylinder space 55a, which forms one "minus chamber". The "minus chamber" 55a is delimited at the bottom by the upper side of the bottom end section 57c of the plunger 57b, and at the top by an annular seal 57d, attached to the top of the pneumatic cylinder 50a, and to the inside by the outside wall of a central, narrower section 57a of the plunger 57c. In order to seal the "minus chamber" 55a at the top, O-ring seal elements 59b have been provided on the outside and inside walls of the seal 57d, fitted into corresponding machined circular grooves in the seal 57d. The central, narrower section 57a of the plunger 57c is a sliding fit in the circular central aperture of seal 57d, and is therefore adjustable in a longitudinal direction in relation to the seal 57d, i.e. in the direction of the arrow A.

The area of underside of the bottom end section 57c of the plunger 57b that delimits the first cylinder space 54a at the top is larger than the upper areas of the bottom end section 57c of the plunger 57b that delimit the second cylinder space 55a at the bottom.

An elongated hollow space 56b runs longitudinally through the middle of the plunger 57b. The hollow space 56b has an essentially annular cross section. A hydraulic line 56a, adjustable in a longitudinal direction, has been fitted in the hollow space 56b, which is connected at the bottom to the "plus chamber" 54a.

According to FIG. 5c, a valve 59 has been provided at the top of the hydraulic line 56a, through which air can be pumped from the outside into the hydraulic line 56a, and into the "plus chamber" 54a. The valve 59 prevents the air in the "plus chamber" 54a, and the hydraulic line 56a from escaping to the outside again.

According to FIG. 5d, a bottom, wider end section of the hydraulic line 56a functions as a valve: As shown in FIG. 5d, the outside area of the bottom, wider end section of the hydraulic line 56a is tapered upwards (here: in a conical shape). Correspondingly the inside area of the hollow space 56b near the bottom, wider end section 57c of the plunger 57b is tapered upwards (here: provided with a step).

By means of the pneumatic force acting on the bottom outside area of the hydraulic line 56a, the hydraulic line 56a is forced upwards in the direction of arrow C In the process an O-ring seal element 59b is forced against the conical top outside area of the bottom, wider end section of the hydraulic line 56a, as well as against the annular bottom inside area of the step provided at the bottom, wider end section 57c of the plunger 57b. In this way the "plus chamber" 54a is pneumatically separated from the "minus chamber" 55a.

When the hydraulic line 56a is forced down as per FIG. 5c in the direction of arrow B against the air pressure by the user of the bicycle, the seal element 59b is released as per FIG. 5d so that air can flow from the "plus chamber" 54a into the "minus chamber" 55a, or vice versa. When the hydraulic line 56a is again released by the user, it is again forced upwards in the direction of arrow C due to the pneumatic pressure as per FIG. 5d. Due to this, the "plus chamber" 54a is again pneumatically separated from the "minus chamber" 55a.

When this takes place, an equalization of forces occurs between "plus chamber" 54a and "minus chamber" 55a at the bottom end section 57c of the plunger 57b, whereby the plunger 57b assumes a "first" position in relation to the pneumatic cylinder 50a, e.g. the setting shown in FIG. 5a.

When the "plus chamber" 54a and the "minus chamber" 55a are hydraulically interconnected, as described above, an equalization of pressure between the chambers 54a and 55a can take place. The plunger 57b slides upwards in relation to the pneumatic cylinder 50a in the direction of the arrow A. To avoid excessive upwards displacement of the plunger 50a and/or a violent stopping of the top end of the bottom end section 57c of the plunger 57b against the seal 57d, an annular shock absorber 63 has been fitted around the central section of the plunger 57b, above the bottom end section 57c of the plunger 57b. The outside diameter of the shock absorber 63 is smaller than that of the pneumatic cylinder 50a.

When the "plus chamber" 54a and the "minus chamber" 55a are separated again, an equalization of forces again takes place between "plus chamber" 54a and "minus chamber" 55a at the bottom end section 57c of the plunger 57b, whereby the plunger 57b assumes a second position in relation to the pneumatic cylinder 50a, lying above the setting shown in FIG. 5a. In this setting the bicycle is particularly well suited to riding downhill.

For uphill riding, a new connection is established between the "plus chamber" 54a and the "minus chamber" 55a, and the plunger 57b pressed downward by the user of the bicycle in relation to the pneumatic cylinder 50a, in the direction of the arrow A.

When the connection between the "plus chamber" 54a and the "minus chamber" 55a is broken again, an equalization of forces between "plus chamber" 54a and "minus chamber" 54b again takes place at the bottom end section 57c of the plunger 57b, whereby the plunger 57b assumes a third setting in relation to the pneumatic cylinder 50a, e.g. one that lies below the setting shown in FIG. 5a. In this setting the bicycle is particularly well suited to uphill riding.

In an alternative embodiment example, instead of the bottom shock absorber fitted to the adjustment device as shown in FIGS. 5a, 5b, 5c, 5d (i.e. the elastomers 69f, 69g, 69h, 69i) an elastomer may be fitted around the thinner section 57a of the plunger 57c and attached to the plunger 57c as a shock absorber (or e.g. also a spring fitted around the narrower section 57a of the plunger 57c). Due to the elastomer or the spring stopping against the top end section of the pneumatic cylinder 50a, any excessive downward displacement of the plunger 57b is prevented. Alternatively or additionally a spring may be fitted underneath the pneumatic cylinder 50a and/or the cartridge. In this way the cartridge is sprung from the wheel suspension and/or the fork sprung against the road, i.e. is in sprung articulation.

FIG. 6 shows an adjusting device according to a further embodiment example of the invention. This is identical to the adjustment device illustrated in relation to FIG. 5a, 5b, 5c, 5d, except that the bottom shock absorbers used in that case (i.e. the elastomers 69f, 69g, 69h, 69i), a float piston 69a and a rubber buffer 69e (as well as a spacer 69b and a valve 69d) can be used as shock absorbers. The float piston 69a, the rubber buffer 69e, the spacer 69b and the valve 69d are identical in construction and in function to the construction and function of the components illustrated in relation to FIG. 2a.

FIG. 8 shows a bicycle with frame 1, with a longitudinal rod 2, a saddle rod 3 and a connecting rod 4. A steering head bearing 5 has been fitted to the common ends of the longitudinal rod 2 and the connecting rod 4, to which one end of a front fork 6 and/or a steering assembly 7 attached to it by a bearing, are connected to the handlebars 8 by a bearing. The front fork 6 has two fork legs (of which the illustration only shows the front fork leg). Each fork leg consists of a piston-cylinder assembly, as illustrated in more detail below.

As an alternative to the embodiment example shown here, a fork with only one fork leg may be provided as well.

A front wheel is attached so that it can rotate around the free end 10 of the piston-cylinder assembly.

From the piston-cylinder assembly 9 a first central pressurizing line 12 and a second central pressurizing line 13 run to a second piston-cylinder assembly 14, in which a check valve 15 has been fitted to the first central pressurizing line 13. No check valve has been provided in the second central pressurizing line 13.

A housing end section 17 of the second piston-cylinder assembly 14 is connected to the connecting rod 4 by means of a swivel joint 18.

A piston rod 19 of the second piston-cylinder assembly is connected to the rear end of the spring element 20 (which is shown on the right-hand side in the illustration), here a single coil spring. One end 21 of the spring element 20 is connected by means of a swivel joint 22 to a swing arm rear wheel suspension 23, here consisting of three interlinked rods 24, 25, 26, of which the swing arm is designed to provide a rotatable mounting for the rear wheel 27.

The swing arm rear wheel suspension 23 is connected to saddle rod 3 by means of a swivel joint 28, at the free end of which a saddle 3a is attached. Here the swivel joint 28 is arranged above a pedal shaft bearing. Alternatively the swivel joint 28 may also be arranged in such a way that its swiveling axis coincides with the rotational axis of the pedal shaft bearing.

The piston-cylinder assembly 9 at the front wheel 11 has a pneumatic cylinder 30a, connected at its bottom to a guide tube 37a by means of a threaded connection. A tube 37b with a piston rod 32a attached to it is fitted to the steering assembly 7. A piston 31a that is a sliding fit in the pneumatic cylinder 30a is fitted to the bottom end of the piston rod 32a. The tube 37b and the piston rod 32a are adjustable in relation to the guide tube 37a and the pneumatic cylinder 30a in a longitudinal direction, i.e. in the direction of arrow A.

The first cylinder space 34a, i.e. the "plus chamber" is created by the pneumatic cylinder 30a. The second cylinder space 35a, i.e. the "minus chamber" is an annular cylinder space, which is created by the pneumatic cylinder 30a, the piston rod 32a and the piston 31a. The bottom outside area of the piston 31 delimiting a first cylinder space 34a at the top, is larger than the annular top outside area of the piston 31a that delimits the second cylinder space 35a at the bottom.

A drilled hole runs through the center of the piston 31a and ends in a metal tube 51, which runs longitudinally upwards through the piston rod 32a to the steering assembly 7, and is connected at its top end to the central pressurizing line 12 (whereby the latter is connected to first cylinder space 34a via the metal tube 51 and the above drilled hole running in a longitudinal direction).

A drilled hole connecting the second cylinder space 35a to the tubular hollow space that lies between the inside wall of the piston rod 32a and the outside wall of the metal tube 51 at the bottom end of the piston rod 32a, runs diagonally through the piston rod 32a. This tubular hollow space is connected to the second central pressurizing line 13 (which is thereby connected to the second cylinder space 35a via the above hollow space between the piston rod 32a and the metal tube 51, and the above diagonal drilled hole) at the top end of the piston rod 32a.

At the bottom end of the pneumatic cylinder 30a there is a spring element 33a. A float body 38a has been fitted over the spring element 33a and seals off the first cylinder space 34a from the cylinder space in which the spring element 33a is found. The latter may be of some elastic material; alternatively a helical coil spring, or air may be enclosed in the cylinder space underneath the float body 38a as a spring element In alternative embodiment examples, no float body 38a has been provided; an O-ring that is not/not completely tight in relation to the cylinder space 38 in which the spring element 33a is found may be provided as float body.

The second piston-cylinder assembly 14 includes a cylinder housing 38, into which the piston rod 19 is inserted longitudinally. The piston rod has a pneumatic piston, which subdivides the cylinder housing 14 into a first (front, left in the illustration) pneumatic cylinder chamber 41, and a second (back, i.e. right in the illustration) pneumatic cylinder chamber 42. The first pneumatic cylinder chamber 41 is designated the "plus chamber", and the second pneumatic cylinder chamber 42 the "minus chamber". The "minus chamber" 42 is an annular cylinder space that consists of the cylinder housing 38, the piston rod 19 and the pneumatic piston. Here too the "plus chamber" 41 has a cross-sectional piston area larger than the "minus chamber" by the cross-sectional area of the piston rod 19. The first pneumatic cylinder chamber 41 is connected to the first central pressurizing line 12, and the second pneumatic cylinder chamber 42 to the second central pressurizing line 13. The central pressurizing lines 12 and 13 are also interconnectable via a bypass line 12', into which a check valve 15' has been inserted.

Below, the operation of the adjustment devices is more closely illustrated. First air is pumped into the adjustment devices. Before the pumping process starts, the valves 15, 15' are opened, and then air is for instance pumped into the "plus chamber" 41 of the second piston-cylinder assembly 14 via a valve fitted to the cylinder housing 38 (not shown here) by means of an air pump. (Alternatively and particularly when the float body 38a is not (and/or not completely airtight in relation to the cylinder space in which the spring element 33a is located, a valve may for instance be fitted to the bottom of the pneumatic cylinder 30a through which air may be pumped into the "plus chamber" 34a past the float body 38a and the spring element.)

Then and/or even during pumping, the user of the bicycle may for instance exert downward pressure on top of the saddle 3a (or alternatively e.g. downward pressure on the handlebars 8) As a result, the piston rod 19 is forced away from the saddle rod 3 (or alternatively towards the saddle rod 3). In the process, air for instance flows from the "plus chamber" 41 of the second piston-cylinder assembly 14 via the central pressurizing line 12 into the "plus chamber" 34a of the first piston-cylinder assembly 9. This forces the pneumatic cylinder 30a of the first piston-cylinder assembly 9 downwards, whereby air for instance flows from the "minus chamber" 35a of the first piston-cylinder assembly 9 via the central pressurizing line 13 into the "minus chamber" 42 of the second piston-cylinder assembly 14.

As a result of the displacement of the piston rod 19 in the second piston-cylinder assembly, the rear axle arm 23 is rotated counter-clockwise around the swivel joint 28, whereby the rear wheel 27 is "retracted".

Furthermore the displacement of the pneumatic cylinder 30a of the first piston-cylinder assembly 9 forces the guide tube 37a downward as well, whereby the front wheel 11 is "extended".

When the desired setting of the adjustment devices has been achieved, valve 15' is first shut, and after that valve 15; during the first operation of the adjustment devices, downward pressure is for instance preferably exerted on the saddle 3a (and/or on the handlebars 8), until the pneumatic cylinder 30a and the piston rod 19 have achieved their respective final settings (i.e. until each has been forced against its respective stop).

If the settings of the adjustment devices are changed, valve 15 of the first central pressurizing line 12 is opened again, and then, for instance by the user of the bicycle pressing down on the handlebars 8 (and/or alternatively on the saddle 3a), the rear wheel 27 is "extended" and the front wheel 11 "retracted" again (and/or alternatively the rear wheel 27 is retracted and the front wheel 11 extended even further).

Preferably the valve 15 is to be manufactured in the shape of a simply operable inching switch for this purpose.

The retracted setting of the rear wheel 27 and/or the extended setting of the front wheel 11 is particularly well suited to downhill riding, and the extended setting of the rear wheel 27 and/or the retracted setting of the front wheel 11 is suited to uphill riding.

FIG. 9 shows a perspective representation of the steering head bearing system 5 of a bicycle from the right front. The steering head bearing system 5 may for instance be located at the common end of a longitudinal rod (not shown here), reaching backwards from the steering head bearing system 5 in a horizontal direction to the saddle of the bicycle, and a diagonal rod (not shown here) reaching out from the steering head bearing system 5 downward and back in the direction of the bicycle's pedal shaft bearing.

As shown in FIG. 9, two fork legs 9a, 9b, one front fork, and a steering assembly 7 are attached to the steering head bearing system 5 of the bicycle. Each fork leg may for instance consist of a pneumatic height-adjustable piston-cylinder assembly, at the bottom end of which the front wheel of the bicycle is suspended.

The piston-cylinder assembly may for instance have a pneumatic cylinder fitted at the lower end, mounted at its bottom end by means of a threaded connection to the guide tube 37a surrounding the pneumatic cylinder. The piston-cylinder assembly may also have a piston rod at the top, attached at its top end to a tube 37b surrounding the piston rod. The piston rod has a piston at its bottom end, which is a sliding fit in the pneumatic cylinder. The piston rod and the tube 37b are adjustable upwards or downwards in relation to the guide tube 37a and the pneumatic cylinder, in the direction of the arrow A.

At its top end the tube 37b is attached to the steering head bearing system 5 by means of the upper and lower fork yoke elements 10a, 10b. The bottom fork yoke element 10b has two tubular clamps 11a, 11b, through which the corresponding tube 37b of each respective fork leg 9a, 9b runs.

As shown in FIG. 10, each clamp 11a, 11b has been fitted with a threaded bolt reaching right across and through the slot machined into each of the clamps 11a, 11b. This allows each clamp 11a, 11b to be compressed (i.e. having its diameter reduced), so that the corresponding tube 37b of each of the fork legs 9a, 9b is firmly held by each corresponding clamp 11a, 11b as shown in FIG. 9, as a result of which the respective fork leg 9a, 9b cannot be displaced upwards or downwards in relation to the fork yoke element 10b in the direction of the arrow A any longer.

As is further apparent from FIGS. 9 and 10, each fork yoke element 10a, 10b has two drilled holes 12a, 12b, 12c, 12d with an essentially circular diameter, running through each fork from top to bottom to the lower yoke element 10a, 10b. One each of the above clamps 11a, 11b has been incorporated in the drilled holes 12a, 12b of the bottom fork yoke element 10b and the corresponding tube 37b of each of the fork legs 9a, 9b directly into the drilled holes 12c, 12d of the upper fork yoke element 10b.

According to FIG. 10 a slot runs back from each drilled hole 12a, 12b, 12c, 12d—right through each corresponding fork yoke, from the top to the bottom of each fork yoke element 10a, 10b—up to the respective back right and/or back left side wall of the corresponding fork yoke elements 10a, 10b. When the slot is compressed—e.g. by means of a screw that is screwed into a threaded hole 13a, 13b running out from the fork yoke element side wall (with the threaded hole 13a, 13b approximately perpendicular to the slot and bisecting it)—the diameter of each drilled d hole 12a, 12b, 12c, 12d is reduced.

Thereby the corresponding clamps 11a, 11b—at the bottom fork yoke element 10b—are compressed (and consequently, as seen in FIG. 9, the lower fork yoke element 10b is locked onto the corresponding tube 37b of the respective fork leg 9a, 9b, as described above), and/or the corresponding inside wall of the drilled hole 12c, 12d directly forced against the tube 37b at the upper fork yoke element 10b— there being no separate clamps provided—thereby securing the corresponding tube 37b at the top fork yoke element 10a.

Alternatively the clamps corresponding to the clamps 11a, 11b may be provided at the upper fork yoke element 10a—as they may be provided at the bottom fork yoke element 10b—or clamps corresponding to the clamps 11a, 11b may for instance be provided only at the upper fork yoke element 10a, but not at the bottom fork yoke element 10b, or the use of clamps at the bottom as well as at the top fork yoke elements 10a, 10b may be dispensed with altogether.

According to FIG. 10, a steering tube 14 reaches up between the top and bottom fork yoke elements 10a, 10b in a vertical direction. As shown in FIG. 11a, a second tube 15, which has a protruding flange 15a, is mounted inside the steering tube 14. The second tube 15 is inserted from the bottom into another drilled hole 12e that runs from bottom to top through the lower fork yoke element 10b, and fitted into the drilled hole 12e, whereby the flange 15a seats into a correspondingly stepped circular recess in the bottom fork yoke element 10b at the second tube 15.

A first ball bearing 16a, which adjoins a first bearing shell 17a upwards, diagonally upwards and outwards, and diagonally downwards and inwards, adjoins an annular, tapered flange protruding upwards from the lower fork yoke element 10b (at a tapered bottom ball bearing section) and is fitted around the second tube 15. The first ball bearing 16a and the first bearing shell 17a (and these adjoining parts) are correspondingly constructed and fitted as a reversed mirror image of a second ball bearing 16b and a second bearing shell 17b, of which the construction and incorporation have been illustrated more closely with reference to FIG. 11b.

Tapered ball bearings are used for the first and second ball bearings 16a, 16b in the present embodiment. As an alternative, roller bearings, or any other suitable ball bearing that is able to absorb axial loads, may also be used. As is apparent from FIGS. 11a and 11b, a third tube 18 has been fitted at the top of the steering tube 14, which has a rearward protruding flange 18a at its top. The third tube 18 is inserted from the top into a further drilled hole 12f traversing the upper yoke element 10a from top to bottom, and is screwed into a corresponding threaded bore 19 at the top end of the second tube 15. As a result of the pre-tensioning achieved in this fashion, the flange 18a on the third tube 18 is pressed against a correspondingly machined stepwise tapered recess in the upper fork yoke element 10a.

The second bearing shell 17b is fitted into the steering tube 14, whereby the upper side of the steering tube 14 engages with the horizontally protruding underside of the first section 19a of the second bearing shell 17b, and the inside of the steering tube 14 with the outer side of a second section of the second bearing shell 17b, which protrudes vertically downwards from the inside end of the first bearing shell section. A third section 19b protrudes downwards and diagonally inwards from the bottom end of the second bearing shell section, and from the bottom end of the third bearing shell section 19b a fourth bearing shell section 19c protrudes vertically inwards.

An annular, surrounding seal element with a T-shaped cross-section has been fitted between the upper side of the first section 19a of the second bearing shell 17b and the underside of the upper fork yoke element 10a, whereby an upwards protruding section of the seal element is fitted into an annular recess on the underside of the upper fork yoke element 10a, and a downwards protruding section of the seal element into an annular recess on the top side of the first section 19a of the second bearing shell 17b. Alternatively an O-ring with a circular cross-section or any other suitable seal element may also be used.

As also shown in FIG. 11b, the second ball bearing 16b is fitted around the third tube 18. A vertical section the outer side of the second ball bearing 16b engages with the inner side of the second section of the second bearing shell 17b, and a diagonal downwards and inwards running section of the outer side of the second ball bearings 16a engages with the inner side of the third section 19b of the second bearing shell 17b. In similar fashion the underside of the second ball bearing 16b engages with the upper side of the fourth section 19c of the second bearing shell 17b.

As shown in FIG. 11b, an annular flange 20 protrudes backwards from the underside of the upper fork yoke element 10a along the outer side of the third tube 18. The flange 20 is tapered down towards the bottom and outside. In similar fashion—as also shown in FIG. 11b—the inner side of the second ball bearing 16b is tapered to the top and inside. The corresponding tapered limiting area of the second ball bearing 16b engages with the correspondingly tapered limiting area of the flange 20 of the upper fork yoke element 10a.

After the third tube 18 has been screwed into the second tube 15, a clamping cone 21, of which the diameter is essentially the same as the inside diameter of the third tube 18, is fitted from the top into the third tube 18. From the upper end of the clamping cone 21, a flange 21a, of which the underside engages with the annular upper area of the third tube 18, and at the corresponding section with the above-mentioned stepped annular machined recess in the upper fork yoke element 10a, protrudes outwards.

The third tube 18 has been provided at the top with two opposing slots running vertically from the upper end of the third tube 18. The slots perform a double function: on the one hand they provide an area where a suitable tool (e.g. a coin) may be inserted for screwing down the third tube 18; on the other, the slot of the third tube 18 can be spread by means of the clamping cone 21, so that its outside area is forced against the inside area of the drilled hole 12f of the upper fork yoke element 10a (and thereby the fork yoke element 10a is forced against the second ball bearing 16b, the second ball bearing 16b against the second bearing shell 17b, and the second bearing shell 17b against the steering tube 14).

Again referring to FIG. 9, a steering assembly 7—as previously described above—is fitted on the upper side of the upper fork yoke element 10a. For this purpose, as seen in FIG. 10, each of the (relatively large) drilled holes 12c, 12d has been provided with the first and or second set of (relatively smaller) threaded bores in a straight line on the inside to accept the tube 37b.

The threaded bores in the two rows of threaded bores run down vertically from the top of the upper fork yoke element 10a. The first and second rows of threaded bores lie parallel to each other, whereby the first row of threaded bores has the same number of threaded bores as the second row of threaded bores (e.g. three, four or five threaded bores). The corresponding (first) threaded bores of the first and second row of threaded bores have an equal distance between each other as the corresponding (second) threaded bores of the first and/or second row of threaded bores. In the same way, the corresponding (second) threaded bores of the row of first and second threaded bores have an equal distance between each other as the (third) threaded bores of the row of first and/or second threaded bores, &c.

In order to mount the steering mechanism 7 onto the fork yoke element 10*a*, the latter, as shown in FIG. 9 has two flanges left and right, of semi-circular diameter, of which the plane undersides engage with the similarly plane top of the fork yoke element 10*a*. Corresponding drilled holes run from top to bottom through the flanges 21 and suitable screws are inserted into them for fixing the steering mechanism 7. Depending on which of the (paired) corresponding threaded bores of the two rows of threaded bores on the upper fork yoke element 10*a* the screws are screwed into, the steering assembly 7 (and/or more precisely the flanges 21) is attached more to the front or more to the back of the upper fork yoke element 10*a* (cf. arrow B, FIG. 10).

From the semi-circular flanges 21—fixed to the fork yoke element 10*a*—corresponding tubular elements 22 protrude horizontally to the inside (FIG. 9). Corresponding spacers 24 are (first) fitted to the tubular elements 22 to revolve around the corresponding central axes of the tubular elements 22. For this purpose, the spacers 24 each has a first, horizontal drilled hole, into which the corresponding tubular element 22 is fitted. In addition, each spacer 24 has a second, horizontal drilled hole 23, parallel to the first drilled hole, into which a rod of the actual handlebars of the bicycle may (first) be fitted so that they can to turn. By turning the spacer 24 around the central axis of the tubular element 22, and/or by turning the handlebar rod around the central axis of the drilled holes 23, the handlebars can be positioned into the desired angular setting (as well as setting them further forward or back by means of the appropriate fitting of the flanges 21).

As seen in FIG. 9, a slot runs from the second drilled hole 23 (to the back in the setting of the spacer 24 shown in FIG. 9) completely from left to right through the spacer 24 (somewhat in the direction the first drilled hole) up to the diagonal lower outside wall of the spacer 24. In similar fashion a slot runs from the first drilled hole (upwards in the setting of the spacer 24 shown in FIG. 9) completely from left to right through the spacer 24 (somewhat in the direction of the second drilled hole) up to the diagonal upper outside wall of the spacer 24.

In each case a threaded bore 25*a*, 25*b* runs more or less perpendicular to the slots—and transects them. When a screw is screwed into the threaded bores, the slot running from the second horizontal drilled hole 23, and the slot running from the first horizontal drilled hole may be closed—in this way the diameter of the first, and the second drilled hole 23 is reduced. Thereby the corresponding spacer 24 is fixed in relation to the corresponding tubular element 22, as is the rod of the handlebars in relation to the corresponding spacer 24.

The invention claimed is:

1. A bicycle adjustment device, in particular for adjusting the height of the front wheel suspension, of the rear wheel suspension, of the saddle or of the steering mechanism, wherein the adjustment device has a double-acting piston/cylinder assembly with a first cylinder space (14*a*, 34*a*) and a second cylinder space (15*a*, 35*a*),
   wherein the two cylinder spaces (14*a*, 34*a*; 15*a*, 35*a*) are interconnectable via a fluid duct (16*a*, 16*b*, 12*a*, 12*b*), and/or whereby the first cylinder space (14*a*, 34*a*) and the second cylinder space (15*a*, 35*a*) are separated from each other by a piston,
   wherein the area of the piston delimiting the first cylinder space (14*a*, 34*a*) is larger than the area of the piston delimiting the second cylinder space (15*a*, 35*a*), and a locking mechanism (85*a*, 11) for fixing the piston,
   in which the fluid duct (16*a*, 16*b*, 12*a*, 12*b*) can be closed by means of a shut-off mechanism (42), and in which the shut-off mechanism (42) is held in one setting by means of air pressure, whereby the fluid duct (16*a*, 16*b*, 12*a*, 12*b*) is blocked.

2. A bicycle adjustment device according to claim 1, in which the shut-off mechanism (42) can be actuated by means of an actuator.

3. A bicycle adjustment device according to claim 1, in which the cylinder spaces (14*a*, 34*a*) are separated by means of a piston, and in which the fluid duct runs directly from the area of the piston delimiting the first cylinder space (14*a*, 34*a*) through the piston to the area of the piston delimiting the second cylinder.

4. A bicycle adjustment device according to claim 3, in which the shut-off mechanism is placed inside the piston.

5. A bicycle adjustment device according to claim 1, in which the cylinder spaces (14*a*, 34*a*) are separated from each other by a piston, and in which the fluid duct runs from the area of the piston delimiting the first cylinder space (14*a*, 34*a*) through the piston and the second cylinder space (15*a*, 35*a*) to an area that is located outside the cylinder spaces.

6. A bicycle adjustment device according to claim 5, in which the shut-off mechanism (42) is located in an area lying outside the cylinder spaces.

7. A bicycle adjustment device according to claim 1, in which the shut-off mechanism (42) has a piston, wherein a first outside area of the piston is connected to the first cylinder space (14*a*, 34*a*), and a second outside area of the piston to the second cylinder space (15*a*, 35*a*) when the shut-off mechanisms (42) is in the closed position, and wherein the first outside area of the piston is larger than the second outside area.

8. A bicycle, which has a bicycle adjusting device according to claim 1.

9. A bicycle with a frame and at least two bicycle adjustment devices according to claim 1, wherein each of at least two adjustment devices has at least a double-acting piston-cylinder assembly (9, 14) with a first cylinder space (34*a*, 41) and a second cylinder space (35*a*, 42) each, and where the two first cylinder spaces (34*a*, 41) are interconnectable through a central pressurizing line (12) fitted for that purpose.

10. A bicycle according to claim 9, whereby the first and second cylinder spaces (34*a*, 41, 35*a*, 42) of the first and/or second piston-cylinder assembly (9, 14) are separated from each other by a piston (31*a*), which has a piston rod (32*a*), and whereby the central pressurizing line (12) is connectable to the first and/or second cylinder space of each piston-cylinder assembly (9, 14) via a duct (51) that runs at least partially through the piston rod (32*a*).

11. A bicycle according to claim 10, in which the line (51) runs at least partially in the longitudinal direction of the piston rod (32*a*).

12. A bicycle according to claim 11, in which the line (51) essentially runs along the total length of the piston rod (32*a*).

13. A bicycle according to claim 9, in which a further central pressurizing line (13), with which the two second cylinder areas (35*a*, 42) are interconnectable, has been additionally provided.

14. A bicycle according to claim 13, wherein the additional central pressurizing line (12) is connectable with the first and/or second cylinder spaces of the corresponding piston-cylinder assembly (9, 14) via a additional line that is led at least partly through the piston rod (32*a*).

15. A bicycle according to claim 14, in which the additional line runs at least partly in the longitudinal direction of the piston rod (32*a*).

16. A bicycle according to claim 15, in which the additional line essentially extends along the entire length of the piston rod (32*a*).

17. A bicycle according to claim 15, in which the line (51) has been shaped as a tube.

18. A bicycle according to claim 17, in which the additional line between the tube and the piston rod (32*a*) has been shaped to lie flat.

19. A bicycle according to claim 9, whereby a shut-off mechanism (15) has been provided in the central pressurizing line (12).

20. A bicycle according to claim 13, in which no shut-off mechanism has been provided in the additional central pressurizing line (13).

21. A bicycle according to claim 13, whereby a shut-off mechanism has been provided in the additional central pressurizing line (13).

22. A bicycle according to claim 9, in which no shut-off mechanism has been provided in the central pressurizing line (12).

23. A bicycle according to claim 9, in which the cylinder spaces (34*a*, 41, 35*a*, 42) are filled with a gas.

24. A bicycle according to claim 9, characterized in that no fixing mechanism, in particular no mechanical and/or hydraulic fixing mechanism has been provided for the first and/or the second piston-/cylinder assembly (9, 14).

25. A bicycle according to claim 9, characterized in that the first and/or the second piston-cylinder assembly (9, 14) have exactly two cylinder areas.

* * * * *